(12) United States Patent
Kim et al.

(10) Patent No.: US 9,471,603 B2
(45) Date of Patent: Oct. 18, 2016

(54) METHOD, APPARATUS AND COMPUTER-READABLE RECORDING MEDIUM FOR MANAGING IMAGES IN IMAGE DATABASE

(71) Applicant: INTEL CORPORATION, Santa Clara, CA (US)

(72) Inventors: Tae-Hoon Kim, Seoul (KR); Minje Park, Seongnam (KR)

(73) Assignee: Intel Corporation, Santa Clara, CA (US)

( * ) Notice: Subject to any disclaimer, the term of this patent is extended or adjusted under 35 U.S.C. 154(b) by 129 days.

(21) Appl. No.: 14/129,328

(22) PCT Filed: Feb. 15, 2013

(86) PCT No.: PCT/KR2013/001202
§ 371 (c)(1),
(2) Date: Jan. 27, 2014

(87) PCT Pub. No.: WO2013/122420
PCT Pub. Date: Aug. 22, 2013

(65) Prior Publication Data
US 2014/0136566 A1 May 15, 2014

(30) Foreign Application Priority Data
Feb. 15, 2012 (KR) .................. 10-2012-0015543

(51) Int. Cl.
*G06F 7/00* (2006.01)
*G06F 17/30* (2006.01)
(52) U.S. Cl.
CPC ..... *G06F 17/30277* (2013.01); *G06F 17/3028* (2013.01); *G06F 17/30247* (2013.01)
(58) Field of Classification Search
None
See application file for complete search history.

(56) References Cited

U.S. PATENT DOCUMENTS

| | | | | |
|---|---|---|---|---|
| 2002/0097914 A1* | 7/2002 | Yaung | ............... | G06K 9/6807 382/225 |
| 2003/0059107 A1 | 3/2003 | Sun et al. | | |
| 2003/0195883 A1* | 10/2003 | Mojsilovic | ........ | G06F 17/30256 |
| 2007/0078846 A1 | 4/2007 | Gulli et al. | | |
| 2011/0106845 A1* | 5/2011 | Lipson | ............ | G06F 17/30247 707/769 |
| 2011/0142335 A1* | 6/2011 | Ghanem | ............ | G06F 17/3025 382/165 |
| 2011/0301441 A1* | 12/2011 | Bandic | ............... | A61B 5/0059 600/306 |

FOREIGN PATENT DOCUMENTS

KR 10-1029160 4/2011

OTHER PUBLICATIONS

PCT Search Report, PCT/KR2013/001202, May 3, 2013, 2 pages.

* cited by examiner

*Primary Examiner* — Tuan A Pham
(74) *Attorney, Agent, or Firm* — Blakely, Sokoloff, Taylor & Zafman LLP

(57) ABSTRACT

Managing images in an image database is described, comprising: when a query image is input, performing a match to determine whether an image similar to the query image exists within the database by comparing the images stored in the database with the query image; and if the image similar to the query image is a recognized image, providing at least one image in an image group to which the recognized image belongs and information thereon as a result, and if the image similar to the query image is an unrecognized image, providing at least one image in an image group to which the unrecognized image belongs as a result. When at least one image of the image group including the image similar to the query image is a recognized image, information on the corresponding recognized image is assigned to the images in the image group and provided as a result.

23 Claims, 8 Drawing Sheets

METHOD, APPARATUS AND COMPUTER-READABLE RECORDING MEDIUM FOR MANAGING IMAGES IN IMAGE DATABASE

The present patent application is a U.S. National Phase Application under 35 U.S.C. 371 of International Application No. PCT/KR2013/001202 filed Feb. 15, 2013, which claims priority from Korean Application No. 10-2012-0015543, filed Feb. 15, 2012, the contents of which are incorporated herein in their entirety by reference.

TECHNICAL FIELD

The present disclosure relates to a method, apparatus and computer-readable recording medium for managing images in an image database. More specifically, the present disclosure relates to a method, apparatus and computer-readable recording medium for managing images in an image database, in which at least one image group is formed by associating the images stored in the image database based on calculated similarities therebetween, comprising, performing a match to determine whether or not an image similar to an input query image exists within the image database by comparing the images previously stored in the image database with the input query image, if the image similar to the query image in the match is a recognized image, providing at least one image in an image group to which the recognized image belongs and information thereon as a result of search, and if the image similar to the query image in the match is an unrecognized image, providing at least one image in an image group to which the unrecognized image belongs as a result of search, wherein, when at least one image of the image group including the image determined as being similar to the query image is a recognized image, information on the corresponding recognized image is assigned to the images included in the image group and is provided as a result of search.

BACKGROUND ART

Recently, as communication techniques are advanced and use of the Internet is expanded, searches are performed in various ways. For example, a computer user may acquire desired information through Internet searches (further specifically, web services), in addition to directly consulting a dictionary or asking a person familiar with the related information, in order to locate the information that the computer user desires to know. That is, after connecting to a web server which provides a search service using a web browser, the computer user may input keywords related to the desired information and receive the search service associated with the web server.

The search service is developed into a variety of types. Particularly in Korea, utilization of search for acquisition of information tends to increase and importance of knowledge search increases. The search service is a function used by a large number of users. In addition, it is general that visits of users to a web site is directly related to advertisement revenues. Thus, a large number of portal sites actually provide search functions.

However, although the number of the sites providing the search functions increases, most of the search functions are generally based on a text search, such as a keyword search or the like. Thus, they do not satisfy desires of users who want to easily obtain desired information in diverse ways.

Particularly, if the desired information is formed of an image, instead of text, in a conventional method, a keyword that is supposed to be related to the corresponding image is first inferred and then, the search is performed by inputting the relevant keyword. Although it is possible to show only the corresponding image results by setting a search range, the image search itself is merely a kind of text-based (keyword-based) search.

This method has a problem that if a user does not know what a corresponding image relates to, it is difficult to infer a relevant keyword, and accordingly, the number of inputting keywords for the search is increased and the desired information may not be easily searched for.

Accordingly, in order to solve the problem, an image search system has been developed, in which, when a user desires to obtain information on a specific image, a search using the image itself, instead of the text-based search, may be performed.

However, the image search system also has problems as described below. First, in order to provide such an image search system, an image database containing a sufficient amount of data is required. When a sufficient amount of data is not contained in the image database, even if a query image is input, it may be possible to fail to provide search result information for the query image. In addition, all of the images which caused a failed result in matches of the query images and the images stored in the image database, i.e., unrecognized images, are discarded, instead of being reused. In this case, until the unrecognized images are manually reflected into the image database, despite repeated searches, it is impossible to provide a search result for the unrecognized images.

As one of techniques for solving the problems, Korean Patent No. 10-1029160 is disclosed by the applicant of the present application. In this technique, if the matching between an input query image and images stored in the image database end in failure, the query image is stored in an unrecognized image database. In the unrecognized image database, the images having an association relationship are collected into image groups based on similarities therebetween. Then, when a specific image and tag information thereon are input from the outside, at least some images of a specific image group in the unrecognized image database are compared with the specific input image to determine whether a similarity therebetween is equal to or higher than a predetermined threshold value. If it is determined that the similarity therebetween is equal to or higher than the predetermined threshold value, at least some images in the unrecognized image database are automatically added, together with the input tag information, to the recognized image database.

However, this technique is disadvantageous in that its configuration is complicated since the unrecognized image database is separately required in addition to the image database. In addition, there is a problem in that the unrecognized images of the image groups stored in the unrecognized image database cannot be used in image recognition and cannot be provided as a search result until a query image (a query image containing tag information) having a similarity with them being equal to or higher than a threshold value is input.

DISCLOSURE OF INVENTION

An object of the present disclosure is to solve at least all the problems described above.

In addition, another object of the present disclosure is to provide one or more embodiments directed to allowing unrecognized images to be effectively used for image search.

Furthermore, still another object of the present disclosure is to provide one or more embodiments directed to allowing an input query image to be compared with images of an unrecognized state in an image database and to provide relevant information for the query image even in a case where the input query image is determined to have a similarity with them equal to or higher than a predetermined threshold value.

The representative configuration of the various embodiments of the present disclosure for achieving the aforementioned objects is as described below.

According to an aspect of the present disclosure, there is provided a method of managing images in an image database, which includes the steps of (a) when a query image is input, performing a match to determine whether or not an image similar to the query image exists within the image database by comparing the images previously stored in the image database with the query image; and (b) if the image determined as being similar to the query image in the match is a recognized image, providing at least one image in an image group to which the recognized image belongs and information thereon as a search result, and if the image determined as being similar to the query image in the match is an unrecognized image, providing at least one image in an image group to which the unrecognized image belongs as a search result, wherein, when at least one image of the image group including the image determined as being similar to the query image is a recognized image, information on the corresponding recognized image is assigned to the images in the image group and is provided as a search result.

According to another aspect of the present disclosure, there is provided a method of managing images in an image database, which includes the steps of (a) when a query image is input, performing a match to determine whether or not an image similar to the query image exists within the image database by comparing the query image with the images previously stored in the image database; (b) based on similarities between the query image and the images stored in the image database, if the image determined as being similar to the query image is a recognized image, including the query image into an image group to which the recognized image belongs, and if the image determined as being similar to the query image is an unrecognized image, including the query image in an image group to which the unrecognized image belongs; and (c) when at least one image of the image group including the image determined as being similar to the query image is a recognized image, assigning information on the corresponding recognized image to the query image newly included in the image group and storing them in the image database.

According to a further aspect of the present disclosure, there is provided an apparatus for managing images in an image database, which includes the image database for storing at least one image group in which images having an association relationship are grouped based on similarities between the stored images; and a search unit for, when a query image is input, performing a match to determine whether or not an image similar to the query image exists within the image database by comparing the images previously stored in the image database with the query image, if the image determined as being similar to the query image in the match is a recognized image, providing at least one image in an image group to which the recognized image belongs and information thereon as a search result, and if the image determined as being similar to the query image in the match is an unrecognized image, providing at least one image in an image group to which the unrecognized image belongs as a search result, wherein, when at least one image of the image group including the image determined as being similar to the query image is a recognized image, information on the corresponding recognized image is assigned to the images in the image group and is provided as a search result.

According to a still further aspect of the present disclosure, there is provided an apparatus for managing images in an image database, which includes a search unit for, when a query image is input, performing a match to determine whether or not an image similar to the query image exists within the image database by comparing the query image with the images previously stored in the image database; and an image group forming unit for, based on similarities between the query image and the images stored in the image database, if the image determined as being similar to the query image is a recognized image, including the query image into an image group to which the recognized image belongs and if the image determined as being similar to the query image is an unrecognized image, including the query image in an image group to which the unrecognized image belongs, when at least one image of the image group including the image determined as being similar to the query image is a recognized image, assigning information on the corresponding recognized image to the query image newly included in the image group and storing them in the image database.

In addition, there is further provided other methods, apparatuses, and a computer-readable recording medium for recording a computer program for executing the aforementioned methods for implementing the present disclosure.

According to various embodiments of the present disclosure, the configuration of the apparatus can be simplified since it is unnecessary to separately construct an image database for storing recognized images and an unrecognized image database for storing unrecognized images.

In addition, according to some embodiments of the present disclosure, even if an input query image is compared with images of an unrecognized state in the image database, if it is determined that a similarity therebetween is equal to or higher than a predetermined threshold value, relevant information for the query image can be provided so that a user may be provided with a desired search result further abundantly.

BEST MODE FOR CARRYING OUT THE INVENTION

Figure 1:
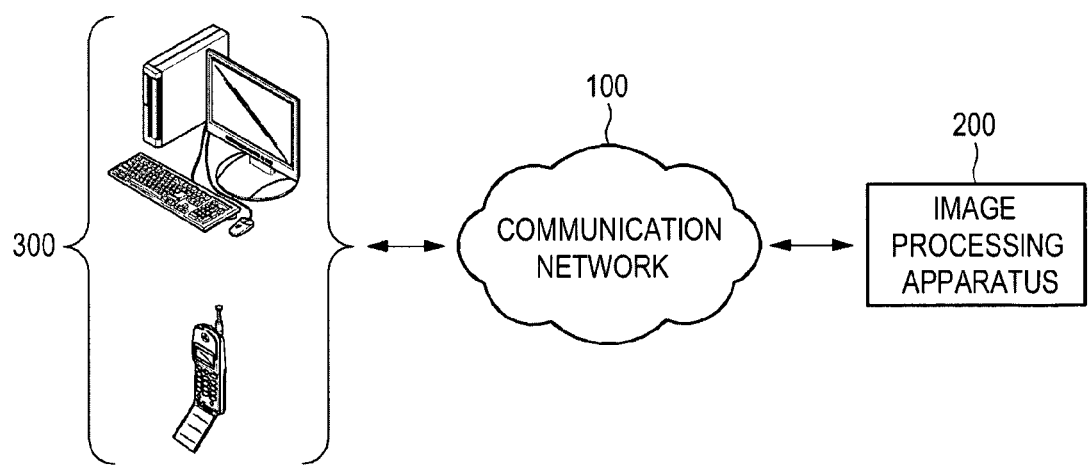
FIG. 1 is a view schematically showing the configuration of an entire system for managing an image database according to some embodiments.

In the following detailed description of various embodiments of the present disclosure, references are made to the accompanying drawings that show, by way of illustration, specific embodiments in which the present disclosure may be implemented. These embodiments are described in sufficient detail to enable those skilled in the art to implement the present disclosure. It should be understood that various embodiments of the present disclosure, although different, are not necessarily mutually exclusive. For example, specific feature, structure, and characteristic described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim. In the drawings, like reference numbers refer to the same or similar function through many ways.

Hereinafter, various embodiments of the present disclosure will be described in detail with reference to the accompanying drawings in order to easily implement the present disclosure by those skilled in the art.

FIG. 1 is a view schematically showing the configuration of an entire system for managing an image database according to embodiments.

As shown in FIG. 1, the entire system according to some embodiments may include a communication network 100, an image processing apparatus 200 and user terminal devices 300.

First, the communication network 100 can be configured regardless of its communication scheme, such as wired or wireless communication and may include a variety of communication networks such as a local area network (LAN), a metropolitan area network (MAN), a wide area network (WAN) and the like. The communication network 100 referred to in the present disclosure may be a well known world wide web (WWW).

According to some embodiments, in a state where at least one image group is formed in an image database (not shown) by associating images stored in the image database based on calculated similarities therebetween, the image processing apparatus 200 may perform a match to determine whether or not an image similar to a query image exists within the image database by comparing the images previously stored in the image database with the input query image. If the image determined as being similar to the query image in the match is a recognized image, at least one image in an image group to which the recognized image belongs and information thereon are provided as a search result. If the image determined as being similar to the query image in the match is an unrecognized image, at least one image in an image group to which the unrecognized image belongs is provided as a search result. When at least one image of the image group including the image determined as being similar to the query image is a recognized image, information on the corresponding recognized image is assigned to the images belonging to the image group and is provided as a search result.

In addition, according to some embodiments, in addition to when a query is input as described above, the image processing apparatus 200 may calculate periodically or aperiodically similarities between the images stored in the image database and may make a group with the images having similarities therebetween equal to or higher than a predetermined threshold value. If a recognized image exists within the image group, the image processing apparatus 200 may update the image database by assigning information on the recognized image to images within the same image group.

In addition, according to some embodiments, when a query image is input, the image processing apparatus 200 may perform a match to determine whether or not an image similar to the query image exists within the image database by comparing the query image with the images previously stored in the image database, and then, based on similarities between the query image and the images stored in the image database, if the image similar to the query image is a recognized image, includes the query image into an image group to which the recognized image belongs, and, if the image similar to the query image is an unrecognized image, includes the query image into an image group to which the unrecognized image belongs. When at least one image of the image group including the image determined as being similar to the query image is a recognized image, information on the corresponding recognized image may be assigned to the query image newly included in the image group and may be stored in the image database.

Meanwhile, the user terminal device 300 according to some embodiments is a digital device having a function of allowing a user to connect to and communicate with the image processing apparatus 200. Any digital device provided with a memory means and equipped with a microprocessor and thus having operation capability, such as a personal computer (e.g., a desktop computer, a notebook computer or the like), a workstation, a PDA, a web pad, a cellular phone or the like, can be adopted as the user terminal device 300.

Hereinafter, the internal configuration of the image processing apparatus 200 which performs an important function in order to implement various embodiments of the present disclosure and the functions of respective constitutional components will be described.

Figure 2:
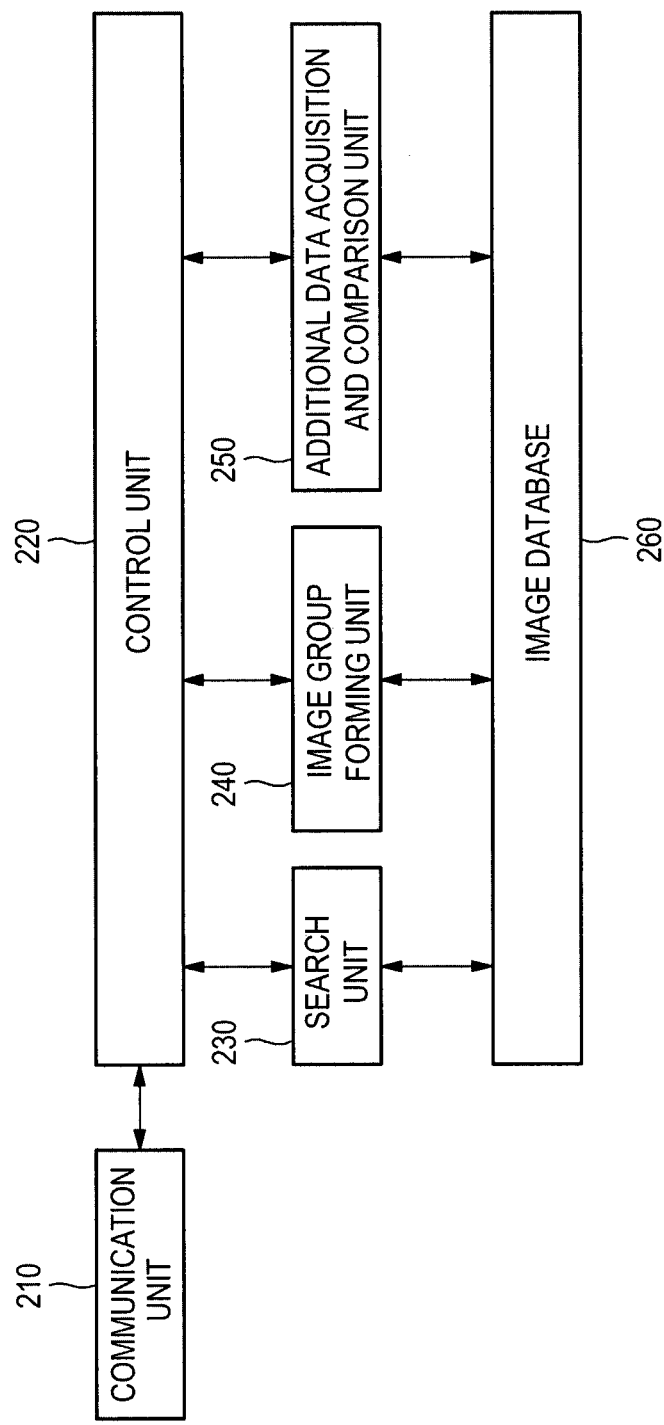
FIG. 2 is a view showing the internal configuration of an image processing apparatus 200 according to some embodiments.

FIG. 2 is a view showing the internal configuration of an image processing apparatus 200 according to some embodiments.

Referring to FIG. 2, the image processing apparatus 200 according to some embodiments may includes a communication unit 210, a control unit 220, a search unit 230, an image group forming unit 240, an additional data acquisition and comparison unit 250 and an image database 260.

According to some embodiments, at least some of the communication unit 210, the control unit 220, the search unit 230, the image group forming unit 240, the additional data acquisition and comparison unit 250, and the image database 260 may be program modules communicating with the user terminal device 300. Such program modules may be included in the image processing apparatus 200 in a form of an operating system, an application program module and other program modules, and physically, they may be stored in a variety of well known memory devices. In addition, these program modules may be stored in a remote memory device capable of communicating with the image processing apparatus 200. Meanwhile, although such program modules include routines, subroutines, programs, objects, components, data structures and the like, which perform specific tasks to be described below or execute specific abstract data types, they are not limited thereto.

First, according to some embodiments, the image database 260 may include at least one image group of images associated and grouped based on similarities therebetween.

According to some embodiments, if a query image is input, the search unit 230 may perform a function of determining whether or not an image similar to the query image (i.e., an image having a similarity with the query image being equal to or higher than a predetermined threshold value) exists in the image database 260 by matching the query image to the images stored in the image database 260.

Specifically, according to some embodiments, the search unit 230 may perform a function of determining whether or not an image similar to the query image exists within the image database 260 by matching a normalized feature region of an image stored in the image database 260 to a normalized feature region of the query image.

In addition, if an image matching to the query image is a recognized image stored in the image database 260 (for example, an image to which information on the corresponding image is assigned in a form of a tag), the search unit 230 provides at least one image in an image group to which the corresponding recognized image belongs and information thereon as a result of search, and if the image matching to the query image is an unrecognized image stored in the image database 260 (for example, an image to which information on the corresponding image is not assigned in a form of a tag), the search unit 230 provides at least one image in an image group to which the corresponding unrecognized image belongs and information thereon as a result of search. If at least one image of the image group including the image determined as being similar to the query image is a recognized image, the search unit 230 may assign information on the corresponding recognized image to the images belonging to the image group and provide them as a result of search.

Here, a feature point and a feature region may be previously extracted from an image for the matching between the images. Here, the feature point means a point that contains a feature element of an object contained in a corresponding image, and the feature region means a region around the feature point containing the feature of the object, which may be set to be robust to the changes in illumination and viewpoint of the image.

As described above, a certain feature extraction technique is required in order to extract a feature point and a feature region from an image. According to some embodiments, as a feature extraction technique, reference may be made to C. Harris et al., "A combined corner and edge detector," Alvey Vision Conference, 1988, or the like (which should be considered as being incorporated herein by reference in its entirety). In this paper, described is a method of estimating a feature region of an oval shape using a second moment matrix, which expresses a slope distribution around a feature point. Of course, an object recognition technique applicable to the present disclosure is not limited only to the method described in the aforementioned paper, but the present disclosure can be implemented by applying various modified examples.

In addition, based on similarities between the images stored in the image database 260, the image group forming unit 240 according to an some embodiments may perform a function of forming an image group by combining images highly associated (for example, having similarities between the images being equal to or higher than a predetermined value). Further specifically, the image group forming unit 240 may perform the function of forming an image group by comparing feature points or feature regions of the images stored in the image database 260 and then combining images that are determined to be similar to each other.

The image group forming unit 240 may perform the function of forming an image group, periodically or aperiodically, in addition to when a query image is input. It is possible that if at least one image of each image group is a recognized image, the image group forming unit 240 may assign information on the recognized image, such as a tag, to images of the same image group (so-called a tag propagation). In addition, it is also possible to form and keep a cluster where the tag propagation has not been performed, i.e., where recognized images and unrecognized images are mixed in the same image group, and to perform the tag propagation if necessary in the future.

Additionally, the image group forming unit 240 may cause the images stored in the image database 260 to be included in one or more image groups. For example, when an image stored in the image database 260 contains two objects, for example, a rose and a pine tree, the image can be commonly included in an image group including an image which contains a rose and an image group including an image which contains a pine tree.

Meanwhile, when it is determined by the search unit 230 that an image matching to the query image exists within the image database 260, the image group forming unit 240 may perform a function of creating an updated image group by combining the query image into an image group in the image database 260 to which the matching image belongs. At this point, it is apparent that the tag propagation in the updated image group may be performed at an appropriate time point.

In addition, even when the additional data acquisition and comparison unit 250, which will be described below, acquires a certain image and corresponding information and determines that an image matching to the certain image exists within the image database 260, the image group forming unit 240 may perform a function of creating an updated image group by combining the certain image into an image group in the image database 260, to which the corresponding matching image belongs. Even at this point, it is apparent that the tag propagation in the updated image group may be performed at an appropriate time point.

Figure 3A:
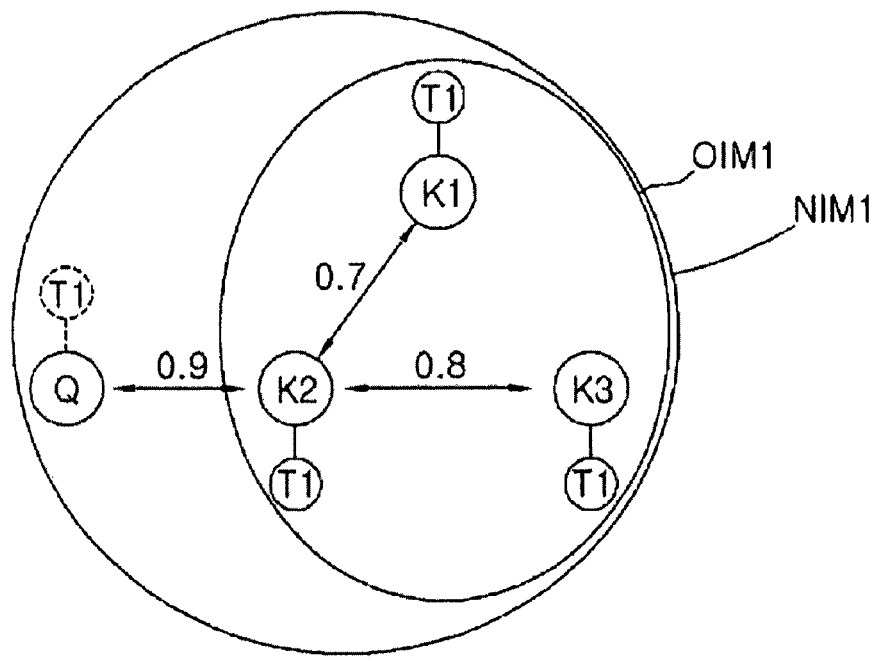
FIGS. 3a to 3c are views showing that image groups are formed by combining a query image with images previously stored in an image database, which have high similarities with the query image, according to some embodiments.
Figure 3B:
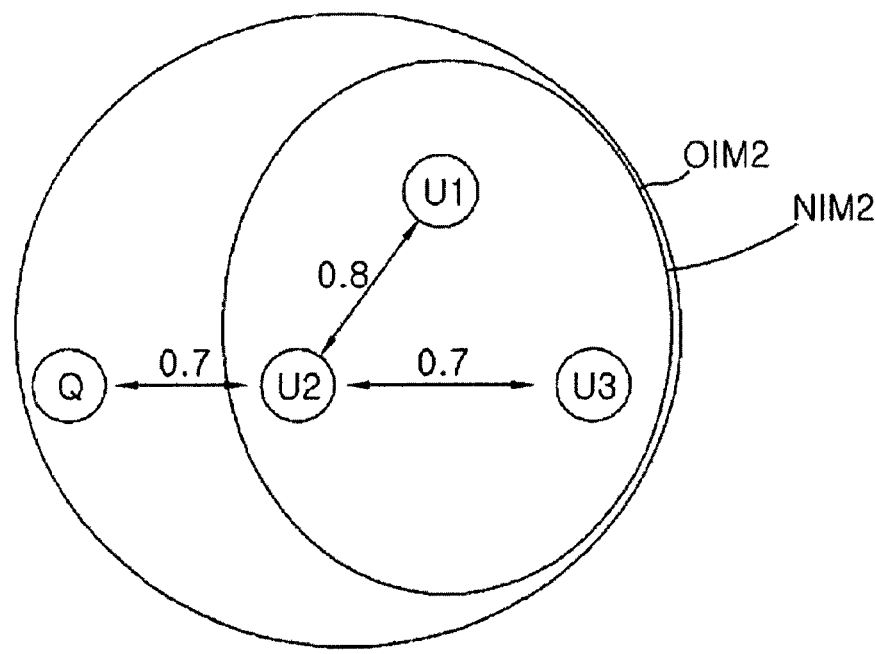

FIGS. 3*a* and 3*b* show creating a cluster in a case where a certain image group previously stored in the image database 260 contains three images having similarities therebetween equal to or higher than a threshold value of 0.7.

In FIGS. 3*a* and 3*b*, circles with K1, K2 and K3 respectively written inside thereof may represent recognized images, circles with U1, U2 and U3 respectively written inside thereof represent unrecognized images, and a circle with a Q written inside thereof represents a query image. In addition, each of circles with a T1 written inside thereof may represent information on the image, i.e., a tag. Lines between the images respectively may represent connection relationships, and the numerals written on the lines represent similarities. OIM1, OIM2 and OIM3 may represent previous image groups, and NIM1, NIM2 and NIM3 represent new image groups. In addition, the dotted circles with T1 written inside thereof may represent a tag assigned through the tag propagation.

Referring to FIG. 3a, when a query image Q is input, the search unit 230 acquires a similarity of 0.9 by calculating a similarity between the query image Q and the recognized image K2 stored in the image database 260. Then, the image group forming unit 240 may create an association relationship between the query image Q and the recognized image K2 stored in the image database 260, include the query image in a new image group NIM1, and store the new image group in the image database 260. In addition, the image group forming unit 240 may assign a tag T1 related to the images K1, K2 and K3 of the image database 260 to the query image Q. Then, the search unit 230 may provide the recognized images K1, K2 and K3 of the new image group NIM1 and information T1 thereon as a result of search. FIG. 3a shows that the similarity between the recognized image K2 of the previous recognized image group OIM1 and the unrecognized query image Q is higher than 0.7 to thereby create an association relationship and the tag T1 is assigned to the unrecognized query image Q to covert the unrecognized query image into a recognized query image so that a new recognized image group NIM1 is created.

Referring to FIG. 3b, when a query image Q is input, the search unit 230 acquires a similarity of 0.7 by calculating a similarity between the query image Q and the unrecognized image U2 stored in the image database 260. Then, the image group forming unit 240 may create an association relationship between the query image Q and the unrecognized image U2 stored in the image database 260 to create a new image group NIM2, and store the new image group in the image database 260. Then, the search unit 230 may provide the images U1, U2 and U3 of the new image group NIM2 as a result of search. FIG. 3b shows that a similarity between the unrecognized images U1, U2 and U3 of the previous unrecognized image group OIM1 and the query image Q is higher than 0.7 to thereby create an association relationship so that a new unrecognized image group NIM2 is created.

Figure 3C:
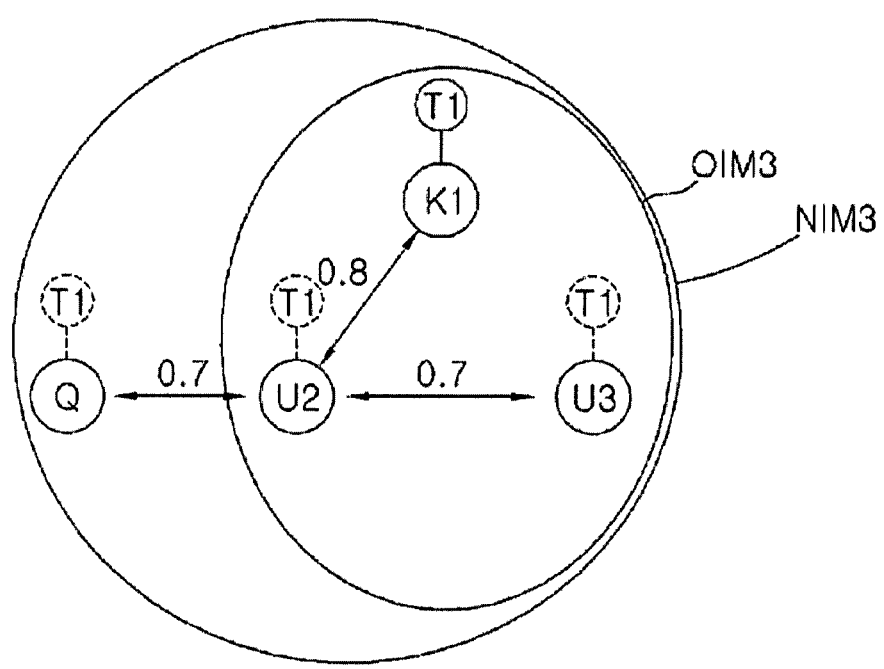

Referring to FIG. 3c, when a query image Q is input, the search unit 230 acquires a similarity of 0.7 by calculating a similarity between the query image Q and the unrecognized image U2 stored in the image database 260. Then, the image group forming unit 240 may create an association relationship between the query image Q and the unrecognized image U2 stored in the image database 260 to create a new image group NIM3, and store the new image group in the image database 260. Then, the search unit 230 may not only provide the images K1, U2 and U3 of the new image group NIM3 as a result of search but also assign a tag T1 related to the recognized image K1 included in the new image group NIM3 to the query image Q and the unrecognized images U2 and U3 to additionally provide them. FIG. 3c shows that a similarity between the recognized image K2 and unrecognized images U2 and U3 of the previous unrecognized image group OIM3 and the query image Q is equal to or higher than 0.7 to thereby create an association relationship so that a new recognized image group NIM3 is created.

Figure 4:
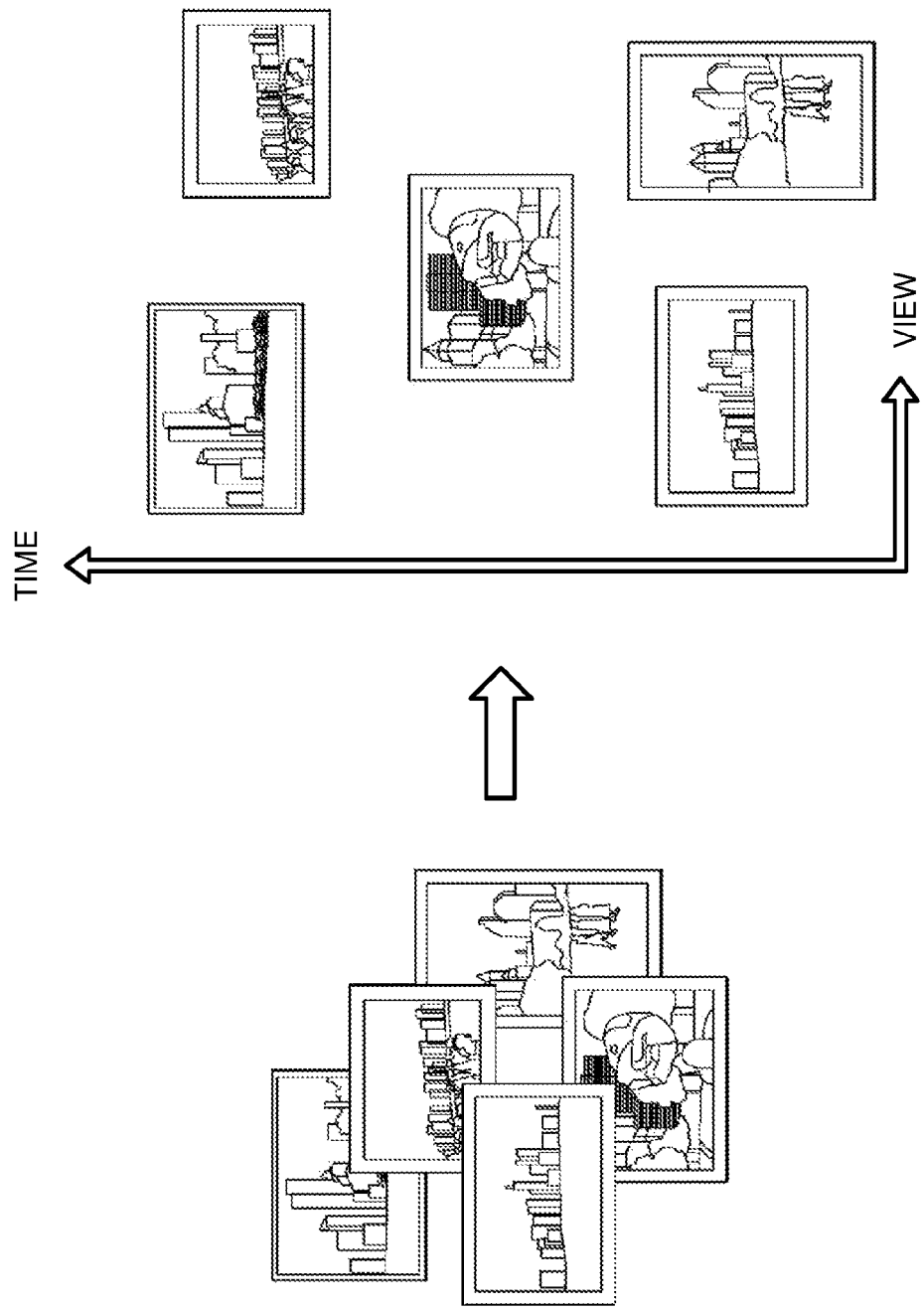
FIG. 4 is a view showing an image group forming unit that collects images similar to each other from images stored in an image database to form an image group, according to some embodiments.

In addition, FIG. 4 shows an embodiment of forming an image group by combining images having a high similarity with each other from the images stored in the image database 260 by the image group forming unit 240 according to some embodiments. Referring to FIG. 4, the image group forming unit 240 according to some embodiments collects images determined as being similar to each other from the image database 260 as shown in FIG. 4 using an image matching technique. Next, the image group forming unit 240 according to some embodiments may store the images arranged and structured by time and diverse viewpoints in order to form the images collected as shown in FIG. 4 into a structured image group. Although FIG. 4 shows an embodiment of arranging and structuring images by time and diverse viewpoints by the image group forming unit 240, the present disclosure is not limited thereto. The image group forming unit 240 may form an image group in a variety of methods.

In addition, the additional data acquisition and comparison unit 250 may acquire a specific image and tag information thereon from outside (for example, a web crawler or a user terminal device) and determine whether or not a similarity between at least some of images in an image group of the image database 260 and the specific input image is equal to or higher than a predetermined threshold value by comparing the at least some of the images and the specific input image. If the additional data acquisition and comparison unit 250 determines that a certain image in the image group has a similarity equal to or higher than the predetermined threshold value, the image group forming unit 240 may update a certain image group, to which the certain image belongs, so that the specific image input from the outside and the tag information thereon may be included in the certain image group included in the image database 260.

For reference, the additional data acquisition and comparison unit 250 may acquire images collected by the web crawler or the like or an image input from the user terminal device together with tag information, excluding the query image (which is assumed not to include tag information, but is not necessarily limited thereto) as additional data, and compare it with the images in the image database 260.

Figure 5A:
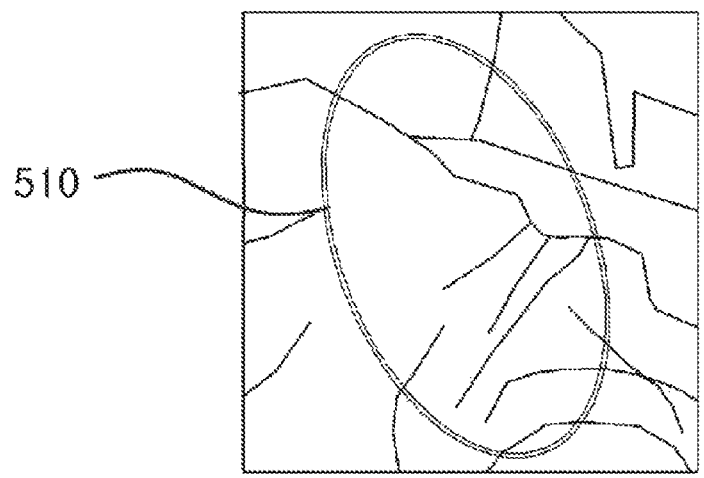
FIGS. 5a to 5d are views showing the configuration of normalizing a feature region according to some embodiments.
Figure 5B:
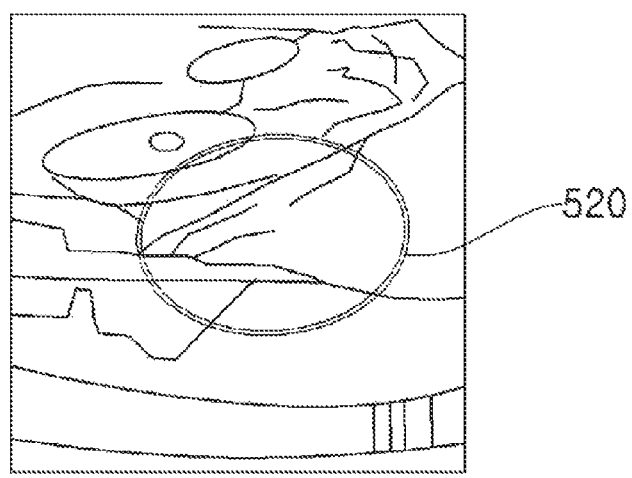
Figure 5C:
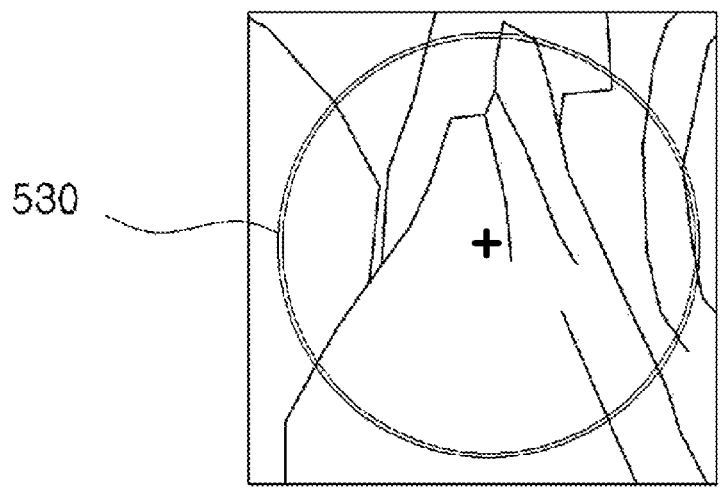
Figure 5D:
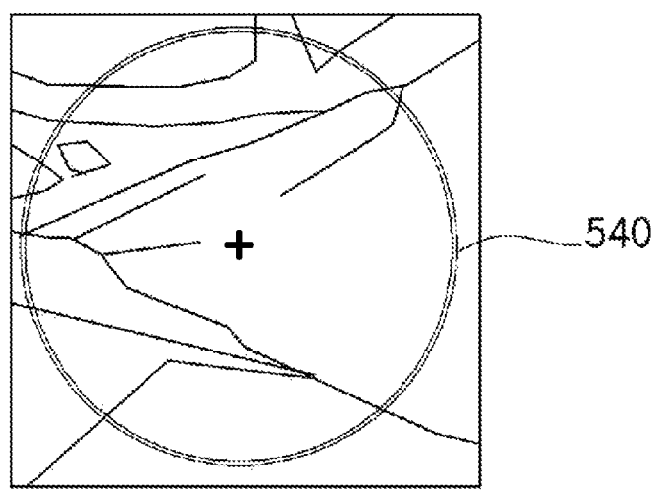

FIGS. 5a to 5d are views showing the configuration of normalizing a feature region according to some embodiments. An image of FIG. 5a is a part of an image collected by a web crawler or the like, which shows a feature region A 510 extracted from the image collected by the web crawler or the like, and an image of FIG. 5b shows a feature region B 520 extracted from an image belonging to an image group. Observing the images of FIGS. 5a and 5b, it can be confirmed that although the images are actually images of the same object, the same feature part of the same object are displayed differently in size and shape in the respective images due to the difference in viewpoint and illumination. Accordingly, it can be confirmed that feature regions 510 and 520 having different sizes and shapes are extracted from the same feature parts of an image collected by the web crawler or the like and an image belonging to an image group. The additional data acquisition and comparison unit 250 may normalize a pair of feature regions having different sizes and shapes into a pair of feature regions having the same size and shape using a certain normalization technique. Accordingly, the pair of feature regions 510 and 520, such as the images of FIGS. 5a and 5b can be normalized into a pair of feature regions 530 and 540, such as images of FIGS. 5c and 5d.

Meanwhile, as described above, a certain feature region normalization technique is required for normalizing a feature region extracted from an image. According to some embodiments, as a feature region normalization technique, reference may be made to K. Mikolajczyk et al., "A Comparison of Affine Region Detectors," International Journal of Computer Vision, September, 2005, or the like (which should be considered as being incorporated herein by reference in its entirety). In this paper, described is a method of normalizing a feature region formed in an ellipse having various sizes and shapes into a circle having a specific size and shape using $M_L^{1/2}$ and $M_R^{1/2}$ of a second moment matrix which estimates viewpoints and lighting conditions of a corresponding image, and a method of rotating a normalized feature region using a rotation matrix R in order to determine whether or not a pair of normalized feature regions indicate the same object. Of course, the normalization technique applicable to the present disclosure is not limited to the method described in the aforementioned paper, but the present disclosure can be implemented by applying various modified examples.

In addition, the additional data acquisition and comparison unit 250 may compare at least one normalized feature region of an image belonging to an image group with at least one normalized feature region of the collected image to search for at least a pair of feature regions determined as indicating the same object from respective images. Furthermore, when at least two pairs of feature regions are searched, the additional data acquisition and comparison unit 250 may compare a relative positional relationship between at least two feature regions on the image belonging to an image group corresponding to the at least two pairs of feature regions and a relative positional relationship between at least two feature regions on the collected image corresponding to the at least two pairs of feature regions using a topology and determine whether or not the image belonging to the image group matches the collected image with reference to a result of the comparison.

Figure 6A:
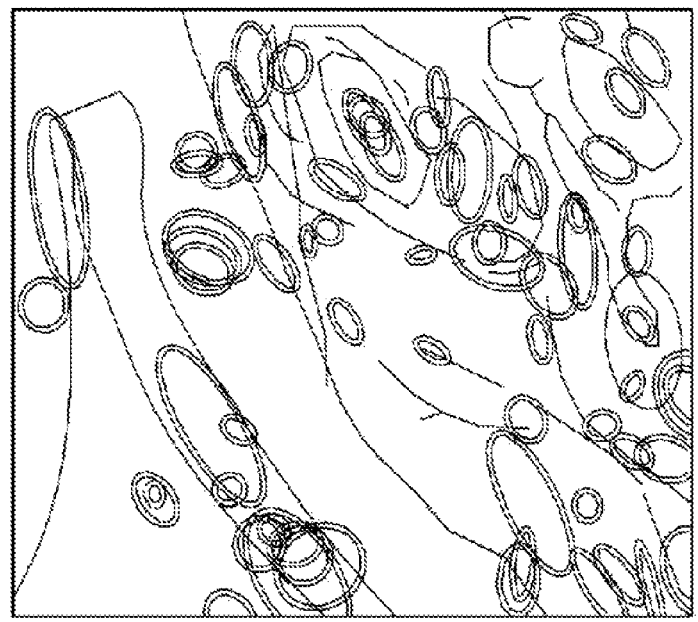
FIGS. 6a to 6b are views showing distribution of feature regions contained in an image collected by a web crawler and an image belonging to an image group according to some embodiments.
Figure 6B:
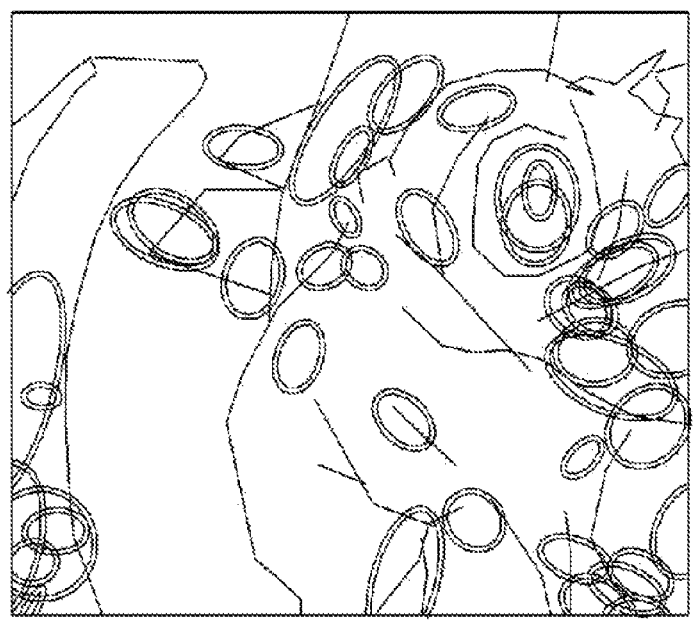

FIGS. 6a to 6b are views showing a distribution of feature regions contained in an image collected by a web crawler or the like and an image, belonging to an image group according to some embodiments. Referring to FIGS. 6a to 6b, the additional data acquisition and comparison unit 250 may determine whether or not two images are similar to each other by comparing a relative positional relationship of a plurality of feature regions on an image collected by a web crawler or the like (i.e., an image of FIG. 6a) with a relative positional relationship of a plurality of feature regions on an image belonging to an image group (i.e., an image of FIG. 6b).

Meanwhile, as described above, a certain topology technique is required for determining whether or not two different images are similar to each other using a relative positional relationship of feature regions. According to some embodiments, as such a topology technique, reference may be made to Derdar Salah et al., "Image matching using algebraic topology," Proceedings of SPIE, Vol. 6066, January, 2006, or the like (which should be considered as being incorporated herein by reference in its entirety). In this paper, described is a method of performing image matching by measuring a similarity between boundary elements of a feature contained in an image using an algebraic topology. Of course, the topology technique applicable to the present disclosure is not limited to the method described in the aforementioned paper, but the present disclosure can be implemented by applying various modified examples.

As described above, according to the image matching method of the present disclosure, there is an effect in that accuracy of image matching between an image collected by a web crawler or the like and an image belonging to an image group can be improved.

Meanwhile, when a new image and information thereon are added to the image database 260, the additional data acquisition and comparison unit 250 may allow both n representative images representing the added image and representative tags assigned to the representative images to be added. In addition, when the representative images are added, the additional data acquisition and comparison unit 250 may also add m sub-images in different viewpoints and time from those of the representative images, together with the representative images. Further, sub-tags for the sub-images added in this case may also be selectively included and added. Here, the representative images and the sub-images refer to images in a relation of sharing one or more feature points or feature regions.

Meanwhile, the image database 260 is a concept including also a database of a broad sense including data records or the like based on a computer file system, as well as a database of a narrow sense. It should be understood that the database mentioned in the present disclosure may include even a collection of operational processing logs if certain data can be extracted by searching the logs. Although it is shown in FIG. 2 that the image database 260 is included in the image processing apparatus 200, the image database 260 may be configured to be separate from the image processing apparatus 200 according to the needs of those skilled in the art implementing the present disclosure.

Meanwhile, the communication unit 210 performs a function of allowing the image processing apparatus 200 to communicate with an external device such as the user terminal device 300.

In addition, the control unit 220 performs a function of controlling data flow between the communication unit 210, the search unit 230, the image group forming unit 240, the additional data acquisition and comparison unit 250, and the image database 260. That is, the control unit 220 controls the flow of data from outside or between the constitutional components of the image processing apparatus 200, so that the communication unit 210, the search unit 230, the image group forming unit 240, the additional data acquisition and comparison unit 250, and the image database 260 may perform their respective unique functions.

Meanwhile, the entire image processing apparatus 200 or at least some components thereof, such as communication unit 210, the search unit 230, the image group forming unit 240, the additional data acquisition and comparison unit 250, and the image database 260 can be implemented by a cloud computing server which virtualizes a plurality of server apparatuses sharing computing resources or server resources.

The above-described embodiments of the present disclosure can be implemented as computer readable codes in a computer readable medium. The computer readable recording medium may include a program instruction, a local data file, a local data structure, or a combination thereof. The computer readable recording medium may be specific to various embodiments of the present disclosure or commonly known to those of ordinary skill in computer software. The computer readable recording medium includes all types of recordable media in which computer readable data are stored. Examples of the computer readable recording medium include a magnetic medium, such as a hard disk, a floppy disk and a magnetic tape, an optical medium, such as a CD-ROM and a DVD, a magneto-optical medium, such as a floptical disk, and a hardware memory, such as a ROM, a RAM and a flash memory, specifically configured to store and execute program instructions. Examples of the program instruction include machine code, which is generated by a compiler, and a high level language, which is executed by a computer using an interpreter and so on. The above-described hardware apparatus may be configured to operate as one or more software modules for performing the operation of the present disclosure, and the reverse case is similar.

While certain embodiments have been described, these embodiments have been presented by way of example only, and are not intended to limit the scope of the disclosures. Indeed, the novel methods and apparatuses described herein may be embodied in a variety of other forms; furthermore, various changes, modifications, corrections, and substitutions with regard to the embodiments described herein may be made without departing from the spirit of the disclosures.

Therefore, the accompanying claims and their equivalents including the foregoing modifications are intended to cover the scope and spirit of the disclosures, and are not limited by the present disclosures.

The invention claimed is:

1. A method of managing images in an image database, comprising:
  (a) performing a match when an image is input as a query image to determine whether or not an image similar to the query image exists within the image database by comparing the images previously stored in the image database with the query image; and
  (b) providing at least one image in an image group to which an recognized image belongs and information thereon as a search result if the image determined as being similar to the query image in the match is the recognized image, and providing at least one image in an image group to which an unrecognized image belongs as a search result if the image determined as being similar to the query image in the match is the unrecognized image,
  wherein, when at least one image of the image group including the image determined as being similar to the query image is a recognized image, information on the corresponding recognized image is assigned to the images in the image group and is provided as a search result, wherein the recognized image is an image to which information thereon is assigned and the unrecognized image is an image to which information thereon is not assigned,
  (c) updating the image database,
  wherein, when at least two pairs of feature regions are searched for, updating the image database includes:
    comparing a relative positional relationship between at least two feature regions on an image belonging to the certain image group corresponding to the at least two pairs of feature regions with a relative positional relationship between at least two feature regions on the specific input image corresponding to the at least two pairs of feature regions using a topology, and
    determining whether or not the image belonging to the certain image group matches the specific input image,
  wherein, when a specific image and tag information thereon are input from outside, updating the image database includes:
    adding the specific image and the tag information thereon input from the outside to a certain image group if it is determined that a certain image in the certain image group has a similarity with the specific image being equal to or higher than a predetermined threshold value.

2. The method according to claim 1, further comprising, when the specific image and tag information thereon are input from outside, comparing at least some images in the certain image group with the specific image to determine whether or not similarities between the at least some images in the certain image group and the specific image are equal to or higher than a predetermined threshold value.

3. The method according to claim 2, wherein the specific image and the tag information thereon are received from a crawler or a user terminal device.

4. The method according to claim 2, wherein updating the image database further includes: determining similarities between the specific input image and the images of the certain image group by comparing at least one normalized feature region of the images of the certain image group with at least one normalized feature region of the specific input image and searching for at least a pair of feature regions determined as indicating a same object from the respective images.

5. The method according to claim 2, wherein at least one or more steps of the steps (a), (b) and (c) are executed by a cloud computing server, the cloud computing server virtualizing a plurality of server apparatuses sharing computing resources or server resources.

6. The method according to claim 1, further comprising, based on similarities between the images stored in the image database, grouping images having similarities with each other being equal to or higher than the predetermined threshold value to thereby form an image group.

7. The method according to claim 6, wherein grouping images further includes: determining the similarities by comparing feature points or feature regions of the images stored in the image database and forming the image group according to the similarities being determined.

8. The method according to claim 1, wherein the step (a) further comprises, when the query image is input, matching normalized feature regions of the images previously stored in the image database to a normalized feature region of the query image to determine whether or not an image similar to the query image exists.

9. The method according to claim 1, wherein updating the image database further includes: adding representative images representing the at least some images in the certain image group and representative tags corresponding to the representative images to the image database.

10. The method according to claim 9, wherein m sub-images in different viewpoints and time from those of the representative images are added together with the representative images.

11. The method according to claim 10, wherein when the sub-images are added, sub-tags for the sub-images are further added.

12. The method according to claim 10, wherein the representative images and the sub-images share one or more feature points or feature regions.

13. A method of managing images in an image database, comprising:
  (a) performing a match when an image is input as a query image to determine whether or not an image similar to the query image exists within the image database by comparing the query image with the images previously stored in the image database;
  (b) based on similarities between the query image and the images stored in the image database,
    including the query image into an image group to which a recognized image belongs if the image determined as being similar to the query image is the recognized image, and
    including the query image in an image group to which an unrecognized image belongs if the image determined as being similar to the query image is the unrecognized image;
  (c) assigning information on the corresponding recognized image to the query image newly included in the image group and storing the query image and the information assigned to the query image in the image database when at least one image of the image group including the image determined as being similar to the query image is the recognized image, wherein the recognized image is an image to which information thereon is assigned and the unrecognized image is an image to which information thereon is not assigned; and (d) updating the image database, wherein, when at least two pairs of feature regions are searched for, updating the image database includes:

comparing a relative positional relationship between at least two feature regions on an image belonging to the certain image group corresponding to the at least two pairs of feature regions with a relative positional relationship between at least two feature regions on the specific input image corresponding to the at least two pairs of feature regions using a topology, and determining whether or not the image belonging to the certain image group matches the specific input image, and wherein, when a specific image and tag information thereon are input from outside, updating the image database includes:

adding the specific image and the tag information thereon input from the outside to a certain image group if it is determined that a certain image in the certain image group has a similarity with the specific image being equal to or higher than a predetermined threshold value.

14. An apparatus for managing images in an image database, comprising:

the image database for storing at least one image group in which images having an association relationship are grouped based on similarities between the stored images; and a memory to store instructions thereon, wherein when the processor executes the instructions, the processor is caused to:

a processor, wherein when the processor executes instructions stored on a memory, the processor performs a method including:

performing a match when an image is input as a query image to determine whether or not an image similar to the query image exists within the image database by comparing the images previously stored in the image database with the query image, providing at least one image in an image group to which a recognized image belongs and information thereon as a search result if the image determined as being similar to the query image in the match is the recognized image, and providing at least one image in an image group to which an unrecognized image belongs as a search result if the image determined as being similar to the query image in the match is the unrecognized image, wherein, when at least one image of the image group including the image determined as being similar to the query image is a recognized image, information on the corresponding recognized image is assigned to the images in the image group and is provided as a search result, wherein the recognized image is an image to which information thereon is assigned and the unrecognized image is an image to which information thereon is not assigned, and when at least two pairs of feature regions are searched for, comparing a relative positional relationship between at least two feature regions on an image belonging to the certain image group corresponding to the at least two pairs of feature regions with a relative positional relationship between at least two feature regions on the specific input image corresponding to the at least two pairs of feature regions using a topology and determining whether or not the image belonging to the certain image group matches the specific input image.

15. The apparatus according to claim 14, wherein the processor performs a method further comprising: when the specific image and tag information thereon are input from outside, comparing at least some images in a certain image group with the specific image to determine whether or not similarities between the at least some images in the certain image group and the specific image are equal to or higher than the predetermined threshold value.

16. The apparatus according to claim 15, wherein the processor performs a method further comprising: receiving the specific image and the tag information thereon from a crawler or a user terminal device.

17. The apparatus according to claim 16, wherein the processor determines similarities between the specific input image and the images of the certain image group by comparing at least one normalized feature region of the images of the certain image group with at least one normalized feature region of the specific input image and searching for at least a pair of feature regions determined as indicating the same object from the respective images.

18. The apparatus according to claim 14, wherein the processor performs a method further comprising: based on similarities between the images stored in the image database, grouping images having similarities with each other being equal to or higher than the predetermined threshold value to thereby form an image group.

19. The apparatus according to claim 18, wherein the processor determines the similarities by comparing feature points or feature regions of the images stored in the image database, and forms the image group based on the similarities.

20. The apparatus according to claim 14, wherein, when the query image is input, the processor matches normalized feature regions of the images previously stored in the image database to a normalized feature region of the query image to determine whether or not an image similar to the query image exists.

21. The apparatus according to claim 14, wherein the processor adds n representative images representing the at least some images in the certain image group and representative tags corresponding to the representative images to the image database.

22. The apparatus according to claim 21, wherein m sub-images in different viewpoints or time from those of the representative images are added together with the representative images.

23. The apparatus according to claim 22, wherein the representative images and the sub-images share one or more feature points or feature regions.

* * * * *